July 30, 1968   ISAMU AMADA   3,394,443
BAND SAW FOR METAL CUTTING
Filed Aug. 4, 1965
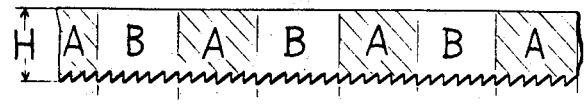
FIG. 1.
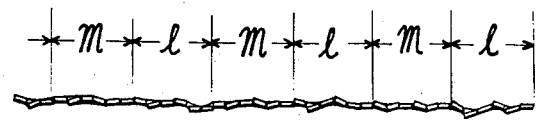
FIG. 2.
FIG. 3.
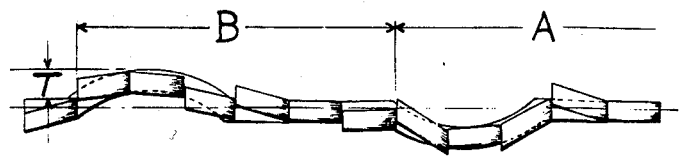
INVENTOR
Isamu Amada
BY
ATTORNEY United States Patent Office 3,394,443
Patented July 30, 1968

3,394,443
BAND SAW FOR METAL CUTTING
Isamu Amada, 21 Otaki-machi, Nakano-ku,
Tokyo, Japan
Filed Aug. 4, 1965, Ser. No. 477,177
3 Claims. (Cl. 29—95)

ABSTRACT OF THE DISCLOSURE

A band saw for metal cutting having working portions and guide portions of different hardness on the band saw body provided by heat treatment and which may suitably be provided with longitudinal or transverse deformation at the lower portion of the blade formed by machining.

---

The present invention relates to a band saw for cutting metallic material.

It is an object of the present invention to provide a band saw having a sharp cuting ability, thereby increasing cutting efficiency and durability.

With the above and other objects in view which will become apparent in the following detailed description, the present invention will be clearly understood in connection with the accompanying drawing, in which:

FIGURE 1 is a front elevational view of a band saw designed in accordance with the present invention;

FIG. 2 is a bottom plan view of the band saw of FIG. 1; and

FIG. 3 is a fragmentary enlarged bottom plan view of the band saw.

A conventional band saw to be used for general purposes is produced in such a way that the band saw is subjected to a heat treatment as an entirety, and uniformly therealong, in order to increase its resistance against abrasion and so that all the blade teeth may be employed in a cutting operation.

In such a case the width of a blade, i.e., from the teeth to the upper edge, is uniform for the entire blade with only a difference in tolerance due to machining. Therefore when such a band saw is used in a cutting operation, the longer the portion to be cut, the smaller the area of the working blade which actually engages the work during the cutting. Moreover, almost all the portions of the blade cannot participate in the cutting operation intermittently because of adjacent blade portions, and they just pass through the kerf or the cut merely with friction and without effecting any cutting. Further they are subject to abrasion as is the case of the working portion of the blade and the thickness thereof approaches a definite value as a whole. Consequently the working blade cannot penetrate sufficiently into the work due to the non-working portion of the blade, and its sharpness and durability is decreased due to uniform abrasion of each part caused by mere friction.

Referring now to the drawings, the present invention overcomes the foregoing disadvantages and provides a band saw wherein the hardness is different at a working portion B and a guide portion A of a band saw body which is achieved by heat treatment and longitudinal, or transverse deformation T, is also suitably provided on the lower portion on the blade by additional machining.

When cutting and machining is effected by employing the band saw for metal cutting according to present invention, since the edge of the guide portion A is not as hard as the working portion B, the width of the blade is subjected to quick abrasion just after the beginning of the cutting and the thickness H thereof decreases so that the edge of the working portion B can penetrate into the work-piece sufficiently for effecting a quicker cutting of the work.

When the edge of the guide portion A is rendered to a relatively slower abrasion due to the characteristics of the material to be cut, the edge of the working portion B sometimes cannot sufficiently effect its operation. In order to avoid this, the band saw of the present invention has at the lower portion of the working portion B a twist such as illustrated in FIG. 3 so that the abrasion speed of the edge of the guide portion A will be increased to improve the functioning of the edge of the working portion B.

According to the results obtained from an experiment in which the band saw, designed in accordance with the present invention, was employed for metal cutting, it was demonstrated that the band saw of this invention has an efficiency three times as much as that of the saw of the prior art used for general purpose.

While I have disclosed one embodiment of the present invention, it is to be understood that this embodiment is given by example only and not in a limiting sense, the scope of the present invention being determined by the objects and the claims.

I claim:
1. A band saw for metal cutting, comprising
   a band saw body including a series of teeth along an edge,
   said band saw body including alternating guide portions and working portions,
   said guide portions and said working portions each constituting a portion of said band saw body and each including a plurality of said series of teeth, and
   said working portions are formed harder than said guide portions.
2. The band saw, as set forth in claim 1, wherein said band saw body is deformed longitudinally of its extent.
3. The band saw, as set forth in claim 1, wherein said band saw body is deformed transversely of its extent.

References Cited

UNITED STATES PATENTS

| | | | |
|---|---|---|---|
| 349,143 | 9/1886 | Clemson | 143—133 |
| 1,222,195 | 4/1917 | Fogle | 143—133 |
| 1,732,692 | 10/1929 | Peiseler | 143—133 |
| 1,790,282 | 1/1931 | Phillips | 143—133 |
| 1,838,785 | 12/1931 | Overstreet | 143—133 |
| 2,787,299 | 4/1957 | Anderson | 143—133 |
| 3,292,674 | 12/1966 | Turner | 143—133 |

FOREIGN PATENTS

| | | |
|---|---|---|
| 584,301 | 1/1947 | Great Britain. |

HARRISON L. HINSON, *Primary Examiner.*